2,756,230

2,4,5-TRIAMINODIHYDROPYRIMIDINE-6-SULFONIC ACID AND METHOD OF PREPARING SAME

Marvin J. Fahrenbach, Pearl River, N. Y., and Kenneth H. Collins, North Plainfield, N. J., assignors to American Cyanamid Company, New York, N. Y., a corporation of Maine No Drawing. Application October 27, 1954,
Serial No. 465,128

6 Claims. (Cl. 260—256.5)

This invention relates to a new organic compound. More particularly, it relates to 2,4,5-triaminodihydropyrimidine-6-sulfonic acid and its alkali metal and ammonium salts and a method of preparing the same.

It is known in the prior art to prepare 2,4,5-triamino-6-hydroxypyrimidine and to react the same to produce 2-amino-4-hydroxy substituted pteridines such as folic acid. Derivatives of this pyrimidine compound such as the bisulfite addition salt are also known. In using this compound or the bisulfite addition salt thereof for the preparation of substituted pteridines the hydroxyl group remains intact.

The compound 2,4,5-triaminodihydropyrimidine-6-sulfonic acid and its salts have not been previously described. We have found that the latter compound having the structure:

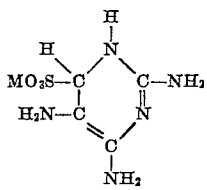

in which M is hydrogen or an alkali metal radical, is a valuable intermediate in the preparation of substituted pteridines having various substituents in the 4-position in a process described and claimed in our copending application, Serial Number 465,154, filed October 27, 1954.

When 2,4,5-triaminodihydropyrimidine-6-sulfonic acid is reacted with a dicarbonyl compound in aqueous acid or alkali near neutrality a 2-amino-4-hydroxypteridine is obtained. However, when using dilute aqueous ammonia the corresponding 2,4-diaminopteridine is prepared. On the other hand, when the same intermediates are used and the reaction carried out in the presence of aqueous hydrogen sulfide, the corresponding 2-amino-4-mercaptopteridine is obtained. The compound 2,4,5-triaminodihydropyrimidine-6-sulfonic acid is therefore very useful in preparing pteridines having different substituents in the 4-position.

The compound of the present invention is preferably prepared by reacting 2,4-diamino-5-nitropyrimidine in aqueous alkali with an alkali metal hydrosulfite. The reaction mixture is then adjusted to a pH of 3.5–4.0 and the precipitated product isolated. After dissolving in water and reprecipitating, the 2,4,5-triaminodihydropyrimidine-6-sulfonic acid is obtained in the form of irregularly shaped plates.

The reaction to prepare the compound of the present invention may be carried out at a temperature of 20° to 100° C. It is preferred to carry out the reaction in water as a solvent although the reaction can be carried out in essentially aqueous solvents containing small amounts of alcohol, dioxane, acetone, etc.

The following examples describe in detail the preparation of 2,4,5-triaminodihydropyrimidine-6-sulfonic acid and salts thereof.

EXAMPLE 1

*2,4,5-triaminodihydropyrimidine-6-sulfonic acid*

To 36.7 parts of 96% nitric acid at 10°–15° C. is added slowly 93.0 parts of 20% oleum. To this solution also at 10°–15° C. is added slowly 16.8 parts of 2,4-diaminopyrimidine sulfate in 15 minutes. The resulting solution is held at 30°–35° C. for 16 hours, then poured onto flake ice mixed with 3.0 parts of urea, and allowed to stand about 15 minutes at 0°–10° C. Concentrated aqueous ammonia is added to a positive alkaline test on Brilliant Yellow test paper, during which the temperature rises to 65° C. 2,4-diamino-5-nitropyrimidine precipitates and is filtered at 40° C. and washed with 200 parts of water at 75° C. It is dissolved in 67.2 parts of concentrated hydrochloric acid, clarified with 0.5 part of activated carbon and the solution made alkaline which ammonia. The product is obtained as needles, which after filtering, washing and drying weighs 7.3 parts.

Ten parts of 2,4-diamino-5-nitropyrimidine is slurried in 250 parts of water and 100 parts of aqueous ammonia at 70°–75° C. Sodium hydrosulfite ($Na_2S_2O_4$) is added slowly over a ten minute period (total 37.5 parts). The solution is clarified if desirable and adjusted to about pH 3.5–4.0 with dilute sulfuric acid. 2,4,5-triaminodihydropyrimidine-6-sulfonic acid precipitates and is isolated on the filter and washed with water. It is redissolved in 375 parts of water at 40° C. with ammonia, a little more sodium hydrosulfite added and the clarified solution is acidified with sulfuric acid. The product is obtained as the free acid as irregularly shaped plates in 66% yield.

EXAMPLE 2

*Potassium 2,4,5-triaminodihydropyrimidine-6-sulfonate*

A solution of 2,4,5-triaminodihydropyrimidine-6-sulfonic acid in dilute aqueous ammonia is treated with 20% aqueous potassium iodide solution and then diluted with ethanol. The potassium salt precipitates and is isolated by filtration and dried. Analysis for carbon, hydrogen, nitrogen, sulfur and potassium agree with the calculated theoretical values for potassium 2,4,5-triaminodihydropyrimidine-6-sulfonate.

EXAMPLE 3

*Pteroylglutamic acid*

A mixture of 2.06 parts of 2,4,5-triaminodihydropyrimidine-6-sulfonic acid, 2.66 parts of para-aminobenzoylglutamic acid, 200 parts of water and 4.43 parts of 1,1,3-tribromoacetone is heated at 70°–75° C., with vigorous stirring and dilute sodium hydroxide is added as needed to maintain pH 2–3. A product precipitates which contains pteroylglutamic acid.

We claim:

1. Compounds of the group consisting of 2,4,5-triaminodihydropyrimidine-6-sulfonic acid, ammonium and alkali metal salts.
2. The compound 2,4,5-triaminodihydropyrimidine-6-sulfonic acid.
3. Potassium 2,4,5 - triaminodihydropyrimidine-6-sulfonate.
4. A method of preparing 2,4,5-triaminodihydropyrimidine-6-sulfonic acid which comprises reacting 2,4-diamino-5-nitropyrimidine with an alkali metal hydrosulfite in an aqueous alkaline solution.
5. A method of preparing 2,4,5-triaminodihydropyrimidine-6-sulfonic acid which comprises reacting 2,4-diamino-5-nitropyrimidine with sodium hydrosulfite in aqueous ammonia.
6. A method of preparing the potassium salt of 2,4,5-triaminodihydropyrimidine-6-sulfonic acid which comprises reacting 2,4-diamino-5-nitropyrimidine with sodium hydrosulfite in aqueous ammonia and subsequently with potassium iodide.

References Cited in the file of this patent
FOREIGN PATENTS 824,945    Germany _____ Dec. 17, 1951